United States Patent
Som

(10) Patent No.: US 9,333,647 B2
(45) Date of Patent: May 10, 2016

(54) METHOD FOR OPERATING AN INDUSTRIAL ROBOT

(71) Applicant: REIS GROUP HOLDING GMBH & CO. KG, Obernburg (DE)

(72) Inventor: Franz Som, Lutzelbach (DE)

(73) Assignee: REIS GROUP HOLDING GMBH & CO. KG, Obernburg (DE)

( * ) Notice: Subject to any disclaimer, the term of this patent is extended or adjusted under 35 U.S.C. 154(b) by 0 days.

(21) Appl. No.: 14/389,834

(22) PCT Filed: Apr. 5, 2013

(86) PCT No.: PCT/EP2013/057179
§ 371 (c)(1),
(2) Date: Oct. 1, 2014

(87) PCT Pub. No.: WO2013/150130
PCT Pub. Date: Oct. 10, 2013

(65) Prior Publication Data
US 2015/0066209 A1    Mar. 5, 2015

(30) Foreign Application Priority Data
Apr. 5, 2012  (DE) .......................... 10 2012 103 030

(51) Int. Cl.
*G05B 19/00* (2006.01)
*B25J 9/16* (2006.01)
(Continued)

(52) U.S. Cl.
CPC  *B25J 9/161* (2013.01); *B25J 13/06* (2013.01); *G05B 19/409* (2013.01);
(Continued)

(58) Field of Classification Search
CPC ........ B25J 9/161; B25J 13/06; G05B 19/409; G06F 3/0482
USPC .................................. 700/248, 250, 252, 264
See application file for complete search history.

(56) References Cited

U.S. PATENT DOCUMENTS 5,465,215 A    11/1995  Strickland et al.
5,937,143 A *  8/1999  Watanabe .............. B25J 9/1671
                                                        700/264

(Continued)

FOREIGN PATENT DOCUMENTS

CN    1972782 A    5/2007
CN    101171105 A  4/2008
(Continued)

OTHER PUBLICATIONS

International Search Report dated Jul. 2, 2013, corresponding to International Patent Application PCT/EP2013/057179.
(Continued)

*Primary Examiner* — Ian Jen
(74) *Attorney, Agent, or Firm* — Ladas & Parry LLP

(57) ABSTRACT

The invention relates to a method for operating an industrial robot by means of an operating device comprising a graphical user interface having a touch display. To improve the operating safety of the industrial robot, at least one virtual operating element representing a function of the industrial robot is displayed on the touch display, a control signal associated with said virtual operating element is sent to a safety controller, and an image is produced by means of the safety controller, which image is then displayed on the touch display. If the image is touched on the touch display, feedback is given to the safety controller so that a function of the industrial robot can be carried out if the displayed image and touching of said image on the touch display match.

16 Claims, 8 Drawing Sheets

Figure 1:
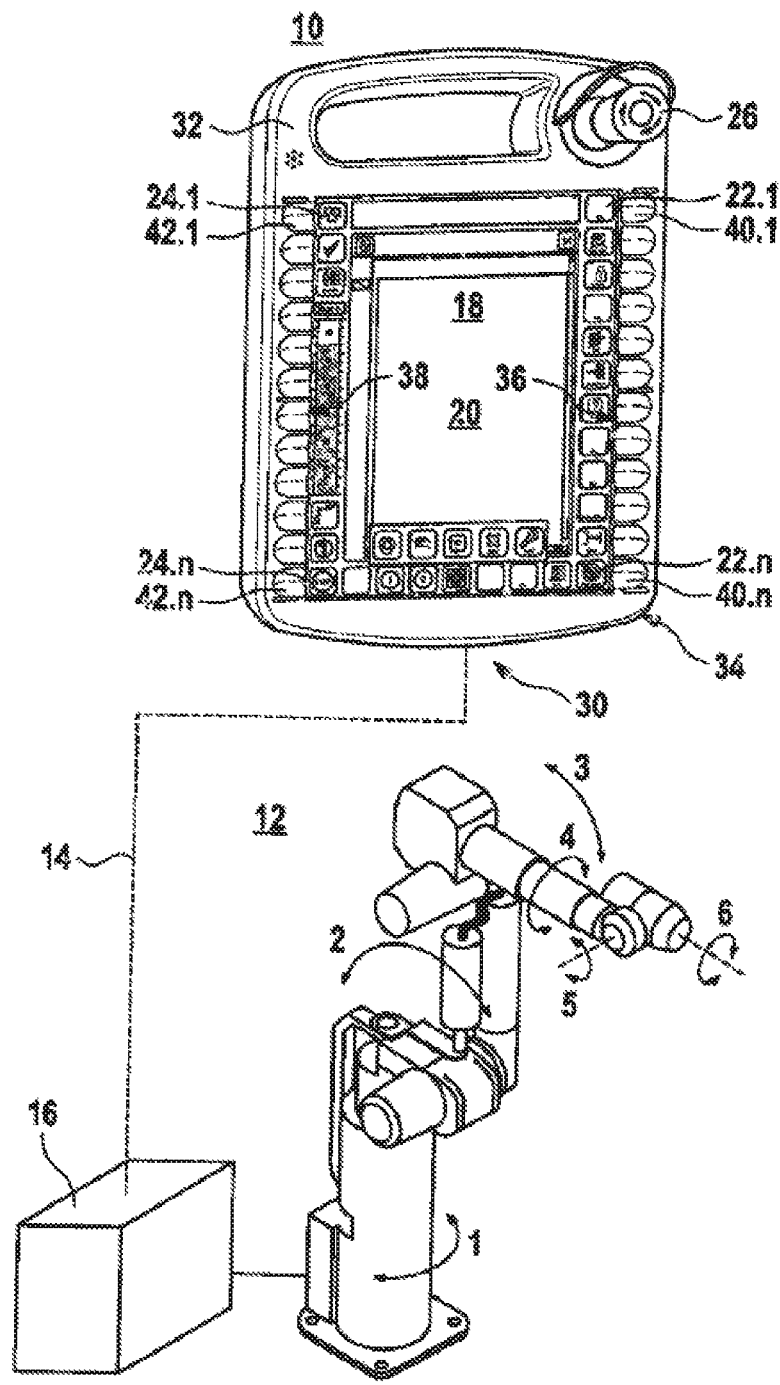

(51) Int. Cl.
*B25J 13/06* (2006.01)
*G05B 19/409* (2006.01)
*G06F 3/0482* (2013.01)
*G06F 3/0484* (2013.01)
*G06F 3/0488* (2013.01)

(52) U.S. Cl.
CPC ............ *G06F 3/0482* (2013.01); *G06F 3/0488* (2013.01); *G06F 3/04842* (2013.01); *G05B 2219/35488* (2013.01); *G05B 2219/36159* (2013.01); *G05B 2219/36168* (2013.01)

(56) References Cited

U.S. PATENT DOCUMENTS

| | | | | |
|---|---|---|---|---|
| 7,403,837 | B2 * | 7/2008 | Graiger | G05B 19/409 361/71 |
| 7,650,205 | B2 * | 1/2010 | Calcagno | G05B 19/42 318/568.1 |
| 7,945,349 | B2 * | 5/2011 | Svensson | B25J 9/1671 700/254 |
| 2003/0101019 | A1 * | 5/2003 | Klausner | G07C 5/08 702/182 |
| 2004/0068333 | A1 * | 4/2004 | Cantello | H01H 9/0214 700/66 |
| 2004/0068335 | A1 * | 4/2004 | Ferla | B25J 13/06 700/86 |
| 2004/0090428 | A1 | 5/2004 | Crandall, Jr. et al. | |
| 2011/0004110 | A1 * | 1/2011 | Shusterman | G06F 19/345 600/509 |
| 2011/0208469 | A1 * | 8/2011 | Sheye | G06F 11/3668 702/123 |

FOREIGN PATENT DOCUMENTS

| | | |
|---|---|---|
| DE | 102007018607 A1 | 10/2008 |
| DE | 10296965 B4 | 1/2012 |
| DE | 102010025781 A1 | 1/2012 |
| DE | 102010039540 A1 | 2/2012 |
| WO | 2010009488 A2 | 1/2010 |
| WO | 2011150440 A2 | 12/2011 |

OTHER PUBLICATIONS

German Office Action dated Nov. 16, 2012, corresponding to German Patent Application 102012103030.8.

Niederhuber, CH.: "Operating panel: multitouch technology combined with haptic elements", etz Elektrotechnik + Automation, No. 1-2/2012, p. 2-4.

* cited by examiner

METHOD FOR OPERATING AN INDUSTRIAL ROBOT

This application is a 371 of PCT/EP2013/057179, filed on Apr. 5, 2013, which claims priority to German Application No. 102012103030.8, filed Apr. 5, 2012.

The invention concerns a method for operating an industrial robot by means of an operating device having a graphic user interface with touch display.

A device for controlling an industrial robot in the form of a manual operating device is described in DE 10 2010 039 540 A1. The manual operating device can be coupled to a robot controller in order to program and control the industrial robot.

The manual operating device comprises an electronics, which comprises a microprocessor, in order to be able to communicate with the robot controller. Moreover, the manual operating device comprises a display, configured as a touch screen, an emergency off button, and a switch designed as a lock. For the manual movement of a robot arm, for example, the manual operating device has various input means which can be activated manually independently of each other or travel means which are configured, e.g., as a 6D mouse or as touch control keys. With the help of the touch screen, it is possible to assign its own coordinate reference system to each of the travel means.

In the known embodiment, however, the control of the industrial robot occurs exclusively via the manually activated input means, so that the manual operating device is costly to produce and vulnerable in operation.

Another device for operating an industrial robot is described in DE 10 2010 025 781 A1. The manual device in the form of a mobile telephone has a touch screen, which on the one hand serves as an output means for putting out information from the robot controller, especially to represent a user interface, and on the other hand serves as a command entry means for entering control commands by means of keys.

The manual device is secured removably to a portable safety mechanism, such as is basically familiar from holders for mobile telephones in automobiles, and connected to the latter via a USB interface. The secure input mechanism has an emergency halt button, an enabling switch, and an operating mode selector switch. The drawback in this configuration is that an operator is always compelled to look at the touch screen to avoid wrong entries for a secure operation of the virtual buttons. This same holds for adverse surrounding conditions, such as bright light or darkness, which would complicate an operating of the touch screen.

A method for operating an industrial robot by means of an operating device having a graphic user interface with touch display is known from DE 10 2010 025 781 A1, comprising the steps: displaying of at least one virtual operating element representing a function or operating mode of the industrial robot on the touch display, selecting of a desired function or operating mode by activating the at least one virtual operating element by the user, detecting of the confirmation of the at least one virtual operating element and sending of a control command corresponding to the selected function or operating mode to a safety mechanism of the robot controller, evaluating of the control command, performing of the selected function or operating mode if an enabling switch is properly activated or an identification matches.

From the citation Niederhuber, Ch.: "Operating panel: multitouch technology combined with haptic elements", in etz Elektrotechnik+Automation, No. 1-2/2012, p. 2-4, one finds a multitouch operating panel with haptic elements in which the input process occurs via virtual operating elements on the operating panel by means of one-finger and two-finger gestures and swipe movements.

Methods for operating an industrial robot by means of an operating device having a graphic user interface with touch display are known from DE 102 96 965 B4, WO 2010/009488 A2 and WO 2011/150440 A2, in which the inputs are monitored by a safety controller.

On this basis, the problem of the present invention is to modify a method of the kind mentioned at the outset such that the safety is enhanced in the operating of an industrial robot.

The problem is solved by a method with the following steps:
  displaying of at least one virtual operating element representing a function or operating mode of the industrial robot on the touch display,
  selecting of a desired function or operating mode by activating or touching the at least one virtual operating element by the user,
  detecting of the activating or touching of the at least one virtual operating element and sending of a control command corresponding to the selected function or operating mode to a safety controller,
  evaluating of the control signal in the safety controller and selection of a graphic information correlated with the selected function or operating mode,
  generating of an image in which the graphic information is positioned at a display position determined by the safety controller,
  transmission of the image to the operating device and display of the image with the graphic information on the touch display,
  detecting of a touch position upon the user touching the displayed graphic information,
  sending back the touch position to the safety controller,
  comparing of the received touch position with the predetermined display position, and
  performing of the selected function or operating mode if the touch position matches up with the display position.

A preferred embodiment is characterized in that the display position in which the graphic information is displayed within the image is determined randomly.

The transmission of the image with integrated graphic information occurs as a graphic file, such as a bitmap, from the safety controller to the operating device and is then presented on the touch display in a position dictated by the safety controller or known to the safety controller.

It should be noted in regard to the touch display that this is preferably a commercially available touch screen with smooth surface, which is preferably configured as a capacitive touch screen, although a resistive touch screen is also possible.

Preferably, as the graphic information, a virtual operating element corresponding to the function or operating mode is displayed or a numerical code is represented graphically.

According to a preferred method, the graphic information is kept securely in a memory of the safety controller, preferably in two channels. The evaluation of the control signal in the safety mechanism also occurs securely, preferably in two channels.

According to another preferred embodiment of the method, the touching of the virtual operating element on the surface of the touch display is detected by determining a first coordinate of a point of contact and a triggering of the function of the virtual operating element occurs if the first coordinate of the point of contact after a lasting contact with the surface of the touch display leaves a predetermined coordinate region by a manual action of the user.

The manual action can be triggered by a gesture of the user. The gesture can be performed by the user dragging a finger on the touch display into or out from the predetermined coordinate region. Preferably, the gesture is performed in a defined direction, and the sensitivity to the finger movement and the intensity of the gesture can be adjusted continuously in order to trigger an action.

Furthermore, the invention involves a unique method of operating an industrial robot with a manual device. In this method, the triggering of a touch function requires a manual action by the user on the touch display. In order to prevent an inadvertent triggering of virtual operating elements by unintentional touching, a function is only triggered if, after touching the touch display, a special "fine gesture" is performed, such as dragging the finger in a defined direction. This produces a "reliable touch".

The gesture required to trigger a function, i.e., the required intensity or nature of the gesture, can be adjusted continuously: it ranges from a simple finger touching, general customary operation of the touch display, to a defined gesture. By haptic markings, such as the special design of the finger grooves in the display margin, the finger can slide onto the touch display in continuation of the finger grooves and thereby trigger a function. If the user notices that he has initiated an unwanted function triggering, he can halt the function triggering by pulling his finger back to the original position.

The device according to the invention is distinguished from the prior art in particular in that the number of hardware components is reduced to the absolute minimum. All operating functions are realized consistently in touch software, with the exception of the safety-oriented "emergency halt" and "enabling" switches. No further electrical components are needed, such as membrane keys, switches or signal lamps. Thus, the system is low-maintenance.

The space savings achieved goes to the advantage of a large comfortable touch display. The virtual operating elements and indications shown on the touch display are designed for the industrial application and are large and high-contrast in format, so that a reliable operation is possible.

Further details, advantages and features of the invention will emerge not only from the claims and the features found herein—in themselves and/or in combination—but also from the following description of sample embodiments shown in the drawing.

Figure 2:
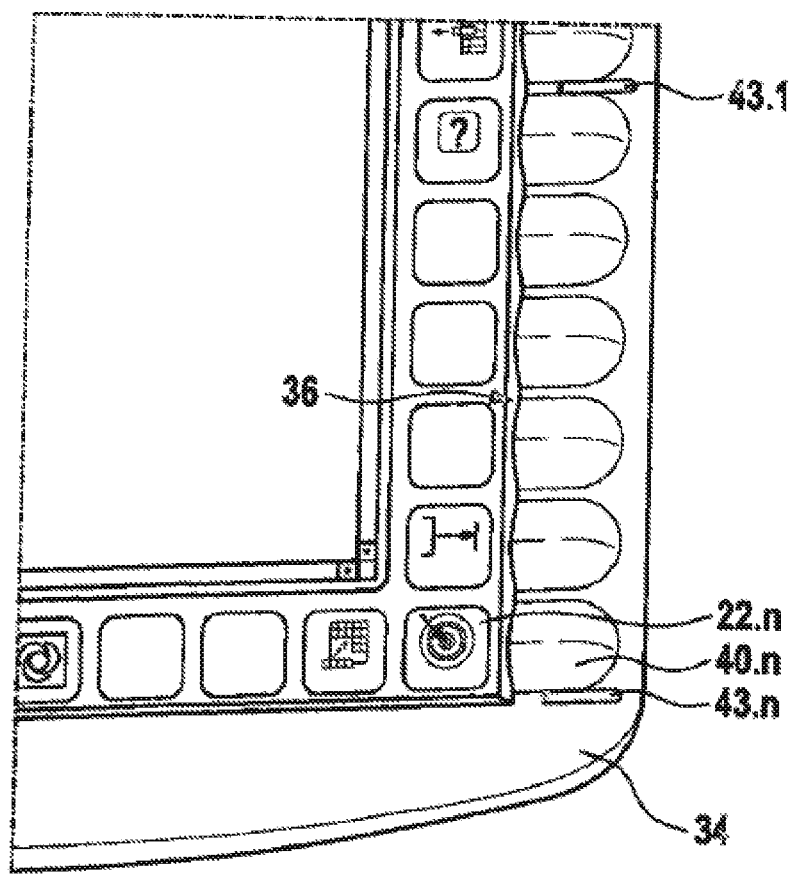
Figure 3:
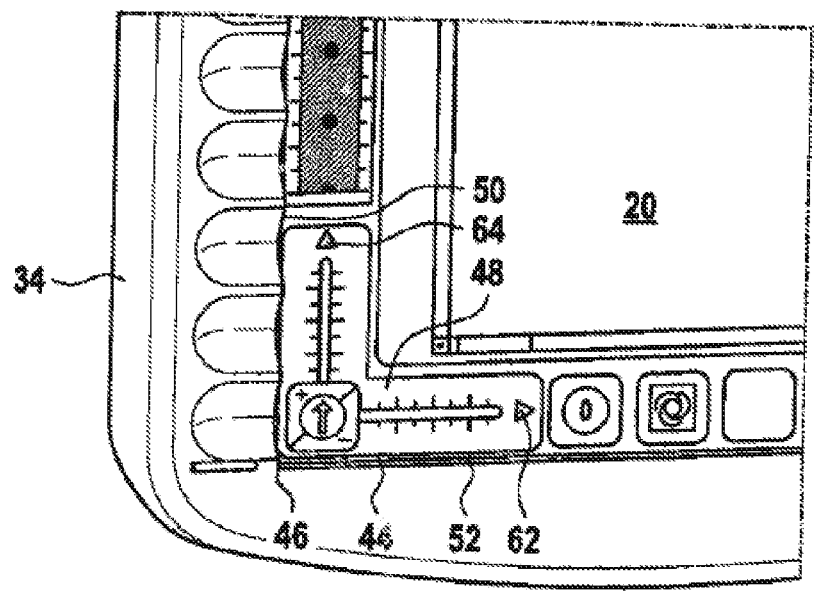
Figure 4:
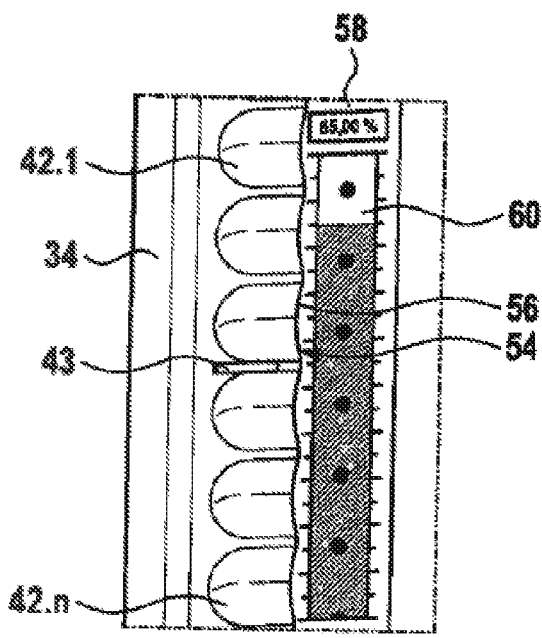
Figure 5:
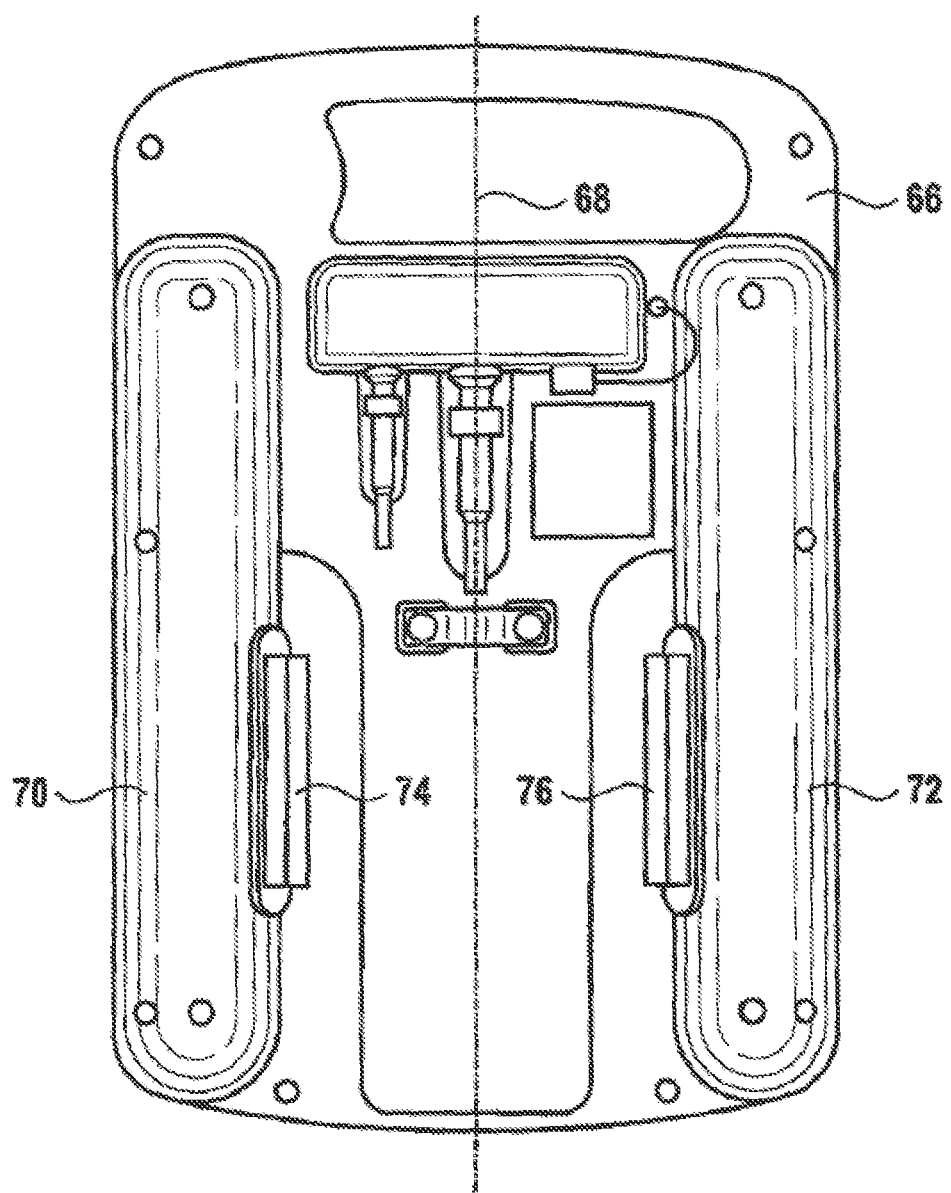
Figure 6:
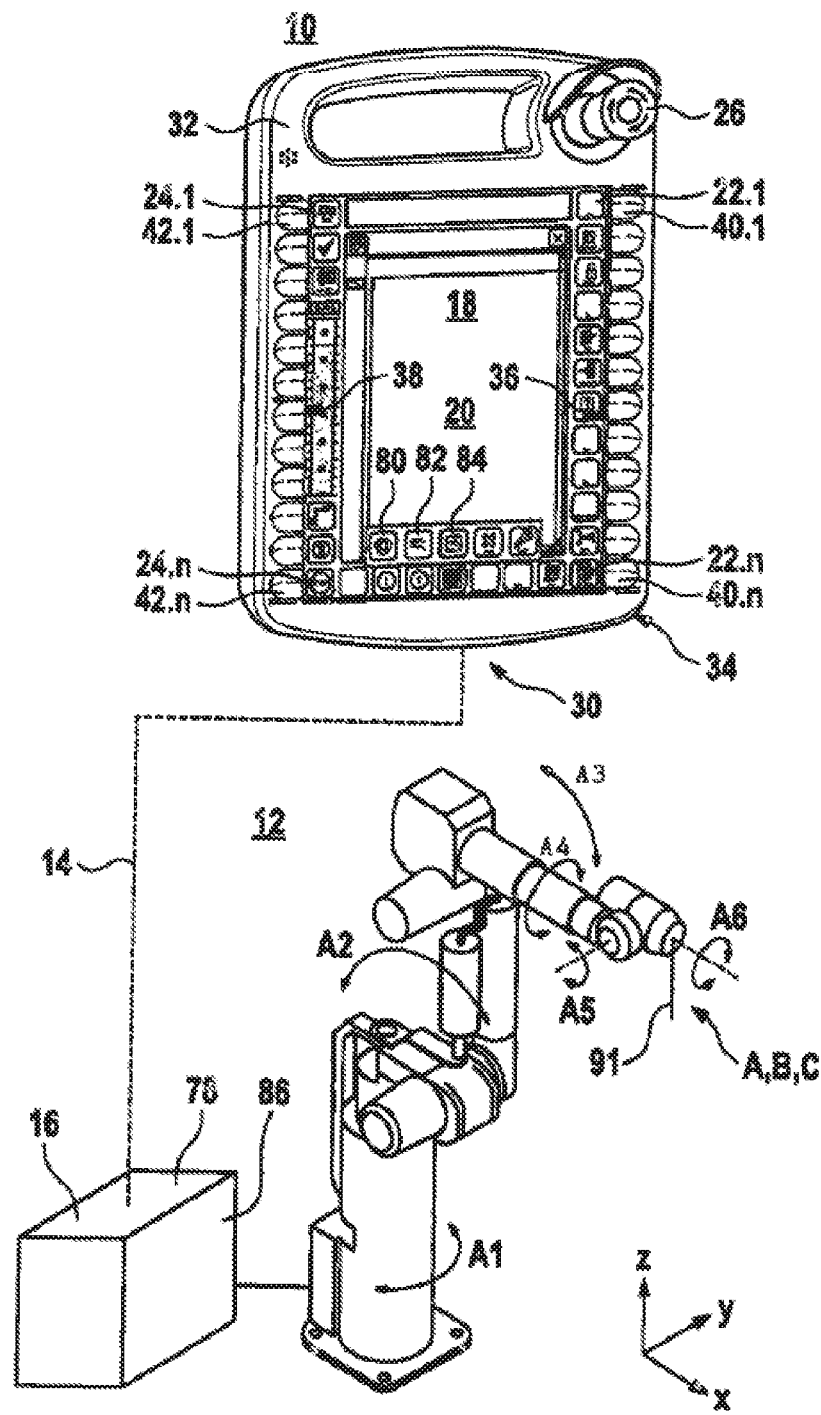
Figure 7:
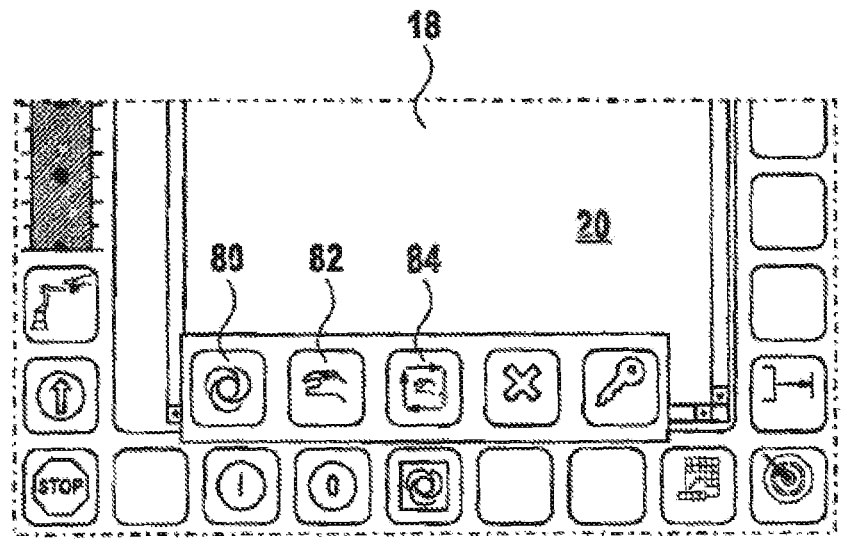
Figure 8:
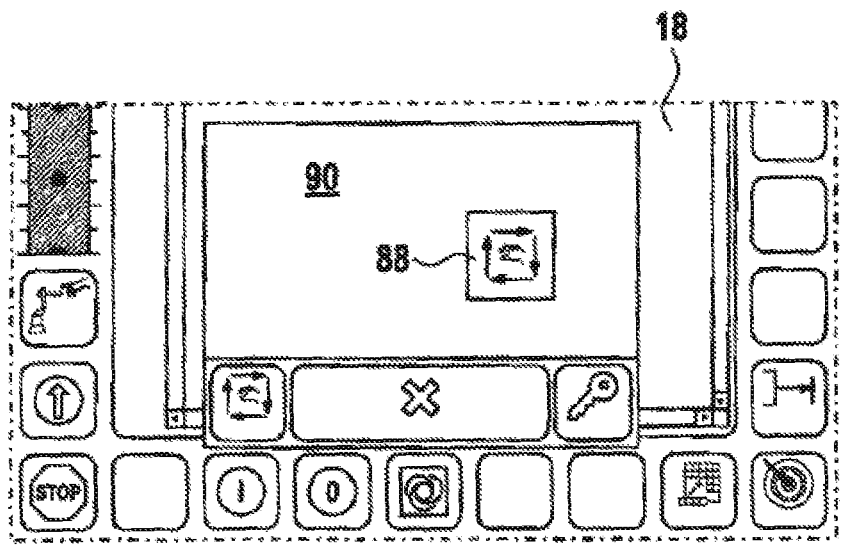
Figure 9:
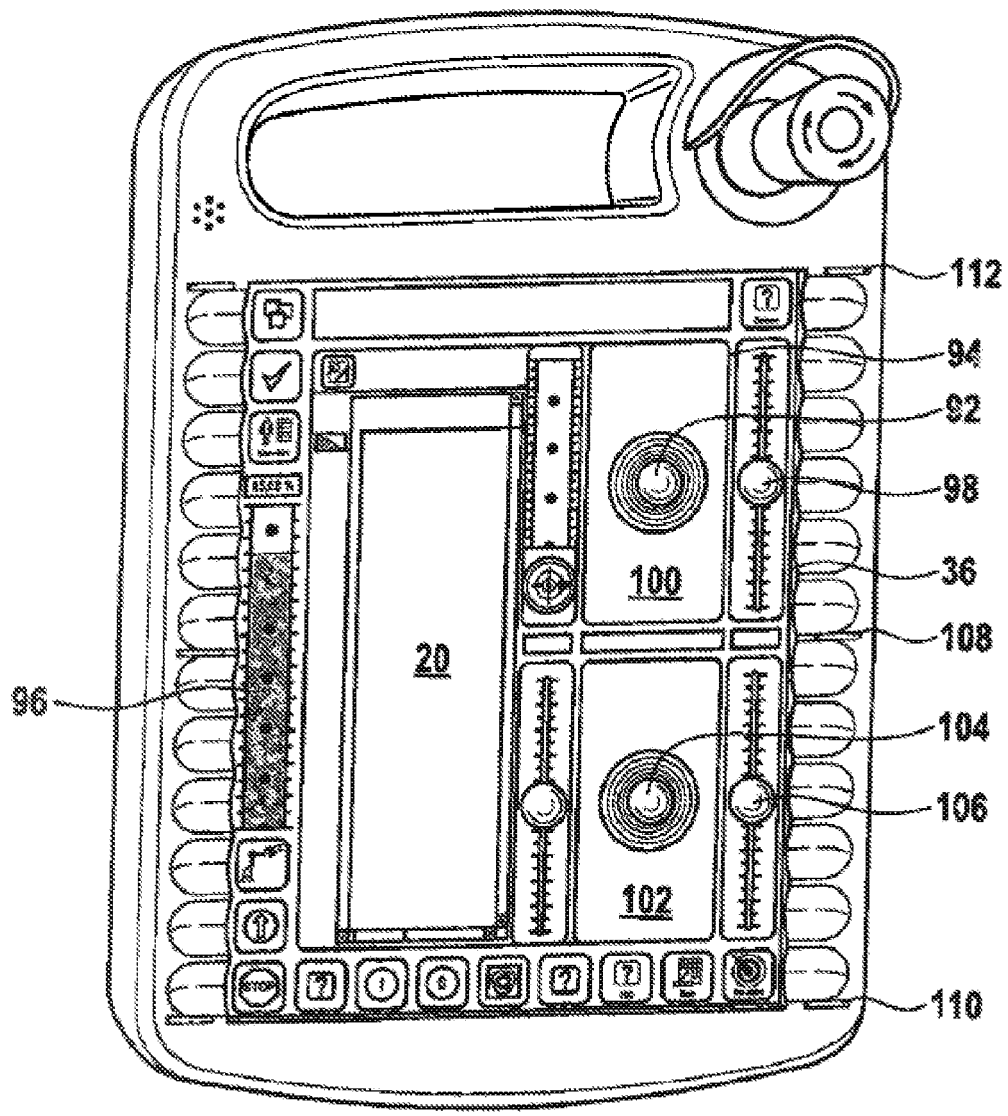
Figure 10:
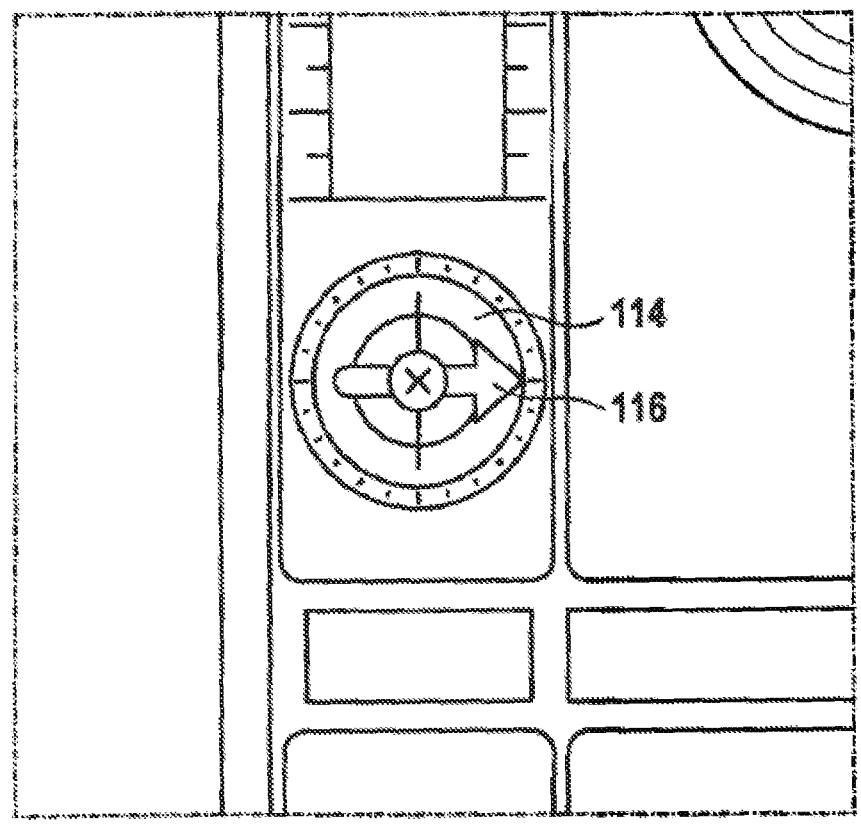

There are shown:

FIG. 1, a manual programming device to operate an industrial robot,

FIG. 2, a segment of a display frame of the manual programming device adjacent to the touch display, FIG. 3, a second segment of a display frame adjacent to the touch display, FIG. 4, a third segment of a display frame adjacent to the touch display, FIG. 5, a rear view of the manual programming device, FIG. 6, a schematic method for operating an industrial robot with an operating device, FIG. 7, a cutout of a user interface of the operating device with virtual operating elements, FIG. 8, a cutout of a user interface of the operating device with an image with graphic information, FIG. 9, a user interface of the operating device with various travel surfaces, and FIG. 10, a virtual operating element to recalibrate the coordinate system of the operating device.

FIG. 1 shows a device 10 in the form of a manual programming device to operate an industrial robot 12. For this, the manual device 10 is connected via a wireless or wireline communication connection 14 to a robot controller 16. The manual device 10 comprises a graphic user interface 18 with a touch-sensitive display 20—hereinafter called the touch display. The touch display 20 serves to indicate at least one virtual operating element 22.1, . . . , 22.$n$, 24.1, . . . , 24.$n$, which represents a function for the control, programming or operation of the industrial robot 12, the corresponding function being triggered when the user touches the virtual operating element 22.1, . . . , 22.$n$, 24.1, . . . , 24.$n$ with his finger or a stylus.

The manual device 10 furthermore comprises a control unit 30 for the control of the graphic user interface 18 and for communication with the robot controller 16, as well as a position sensor for determining the position and inclination of the operating device.

The graphic user interface 18 with the touch display 20 is arranged together with the control unit 30 in a housing 32. The housing 32 forms a display frame 34 enclosing the touch display 20 at the margins. On a top side of the housing 32, furthermore, there is arranged a safety-oriented "emergency halt" switch 26.

The virtual operating elements 22.1, . . . , 22.$n$ and 24.1, . . . , 24.$n$ are each arranged along a frame segment 36, 38 of the display frame adjacent to the touch display 20. In order to enable a blind operation of the virtual operating elements 22.1, . . . , 22.$n$ and 24.1, . . . , 24.$n$, according to a first independent notion of the invention there are haptic markers 40.1, . . . , 40.$n$ and 42.1, . . . , 42.$n$ arranged in the frame segment 36, 38. Each haptic marker 40.1, . . . , 40.$n$, 42.1, . . . , 42.$n$ is coordinated with a virtual operating element 22.1, . . . , 22.$n$, 24.1, . . . , 24.$n$.

In particular, the virtual operating element 22.1, . . . , 22.$n$, 24.1, . . . , 24.$n$ is directly adjacent to the haptic marker 40.1, . . . , 40.$n$ or 42.1, . . . , 42.$n$, so that an immediate transition from the haptic marker 40.1, . . . , 40.$n$ or 42.1, . . . , 42.$n$ to the virtual operating element 22.1, . . . , 22.$n$, 24.1, . . . , 24.$n$ occurs. Thus, in virtually the same movement, the finger is guided along a haptic marker 40.1, . . . , 40.$n$ or 42.1, . . . , 42.$n$ to the virtual operating element 22.1, . . . , 22.$n$, 24.1, . . . , 24.$n$. This prevents or minimizes wrong operation: first of all, the position of the virtual operating element is sensed with the help of the haptic marker and then the function is triggered by touching the virtual operating element. Moreover, it is not required to specially configure the touch screen, i.e., the display 20. In particular, and unlike the prior art, it is not required to provide special overlayered materials on the display, which otherwise cause loss of transparency.

The haptic markers 40.1, . . . , 40.$n$ and 42.1, . . . , 42.$n$ form a guideway through which the user's finger is taken to the coordinated virtual operating element 22.1, . . . , 22.$n$, 24.1, . . . , 24.$n$.

FIG. 2 shows an enlarged view of the operating elements 22.1, . . . , 22.$n$ and the haptic markers 40.1, . . . , 40.$n$ coordinated with them.

Thanks to the arrangement of the virtual operating element 22.1, . . . , 22.$n$ and 24.1, . . . , 24.$n$ along the frame segments 36, 38 having the haptic markers 40.1, . . . , 40.$n$, 42.1, . . . , 42.$n$, a secure operation of the virtual operating elements is assured. In this, the stepped and especially distinctive frame segment 36, 38 serves for a tactile orientation on the touch display 20.

In the sample embodiment shown in FIG. 2, the haptic markers 40.1, . . . , 40.$n$ are configured as finger grooves, which are shaped so that they can be easily felt with the fingers and ensure a guiding of the finger from the frame segments 36, 38 in the direction of the coordinated virtual operating element 22.1, . . . , 22.*n* or 24.1, . . . , 24.*n*.

Moreover, haptic markers 43.1, . . . , 43.*n* are provided which are fashioned as knobs and are arranged on a surface of the display frame 34.

On the one hand, this compensates for the lacking haptics of a touch display 20 and on the other hand the user can direct his visual attention to the industrial robot and the process, without having to look at the manual operating device 10, which enhances the operating safety on the whole. It makes possible a "blind operation".

FIG. 3 shows an embodiment of a haptic marker 44 as a corner 46 of the display frame 34 adjacent to the touch display 20. The corner 46 of the display frame 34 defines a clear, exact position on the touch display 20. A virtual operating element 48 for these selected positions is provided on the touch display 20, which is moved for example in a linear direction along one frame segment 50 on the display side or the other frame segment 52 of the frame corner 44.

FIG. 4 shows another embodiment of a haptic marker 54, which is configured as a segment 56 of the display frame 34 at the display side. A user's finger can perform a sliding movement along the frame segment 56, which can move a virtual slider element 60 running along the frame segment 56.

The haptic markers 40.1, . . . , 40.*n*, 42.1, . . . , 42.*n* depicted in FIGS. 1 and 2 and configured as finger grooves form a haptic orientation on the display margin with high resolution, e.g., for the feeling of positions of the virtual operating elements 22.1, . . . , 22.*n*, 24.1, . . . , 24.*n*, since these are arranged immediately next to the finger grooves. Each finger groove can be clearly coordinated with a virtual operating element. The finger grooves 22.1, . . . , 22.*n*, 24.1, . . . , 24.*n* are half open in form and open in the direction of the touch display 20, so that a finger can slide on the touch display as if guided in a gutter and trigger a function of the virtual operating element 22.1, . . . , 22.*n*, 24.1, . . . , 24.*n*.

According to an independent notion of the invention, the triggering of a function coordinated with the virtual operating element 22.1, . . . , 22.*n*, 24.1, . . . , 24.*n* requires a manual action of the user on the touch display 20. In order to prevent an unintentional triggering of the virtual operating elements 22.1, . . . , 22.*n*, 24.1, . . . , 24.*n* by accidental touch, a function is only triggered if a predefined gesture is performed after touching the touch display 20, such as dragging the finger in a defined direction. The sensitivity of the response to the finger movement can be adjusted continuously via a regulator. Thus, the intensity of the required gesture in order to trigger functions can be adjusted continuously. It ranges from a simple finger touch, general customary operation of the touch display 20, to a special fine gesture. Thanks to the special distinctive form of the finger grooves 22.1, . . . , 22.*n*, 24.1, . . . , 24.*n* in the frame segment 36, 38 of the display frame, the finger can slide in continuation of the finger grooves onto the touch display and there trigger a function. If the user notices that he has initiated an unwanted function triggering, he can abort the function triggering by pulling back his finger to the original position.

As soon as the user touches the virtual operating element 22.*n* with his finger, e.g., starting from the finger groove 40.*n*, the corresponding coordinates of the point of contact on the touch display are detected by the control unit 30. In keeping with the definition of predetermined gestures, the corresponding function will only be triggered if the user's finger leaves a predetermined coordinate region or reaches a predefined coordinate region. When the virtual operating element is deflected and thus ready for triggering (triggering occurs upon releasing the finger), this is indicated by an optical tag, e.g., by a colored highlighting, on the operating element. If an accidental deflecting is canceled by moving the operating element back to its origin, this is indicated by the vanishing of this optical tag.

According to another independent embodiment of the invention, the virtual operating elements 48 which are placed, e.g., in the corner 46 of the display frame 34, are associated with a particular gesture controller. For example, they can be moved along the frame segments 50, 52 in two directions 62, 64, as is shown in FIG. 3. Each direction of movement 62, 64 is coordinated with a selectable function. Thus, e.g., it is possible to activate a function A by moving along the frame segment 52 and a function B by moving along the frame segment 50. The degree of deflection is evaluated, with two evaluation options being provided.

According to a first evaluation option, the degree of deflection is transmitted to the function at once as an analog parameter, such as a speed setting. If the finger is released in the deflected position, the analog value immediately drops to zero. If the finger is again slid back to the starting position 66, the parameter moves back to zero again, analogously to the deflection. This function can be used, e.g., to start a movement program in positive or negative directions and continuously vary the speed in this process.

According to a second evaluation option, a switching function is triggered when a definable threshold value is crossed. The activation of the function only occurs when the finger leaves the touch display 20 in the deflected position. But if the finger is moved back to the zero position without being released on the frame segments 50, 52, the triggering of the function is prevented.

Another ingenious notion of the invention pertains to the realization of a so-called override function (speed regulator), which is realized by the slider operating element 60, which is shown in FIG. 4. For this, the slider operating element 60 is placed along the frame segment 56 and central to the haptic marker 43. In this way, the position of the slider operating element 60 can be felt and adjusted by sliding one's finger along the frame segment 56. Blind adjusting is additionally supported by the haptic markers 22.1, . . . , 22.*n*, 43, 54 of the frame segments 38, 56. The so-called override can be adjusted by a definite amount, such as 20%, during a sliding between two haptic markers. Other analog quantities such as process parameters can also be adjusted in blind operation by means of the slider operating element 60 arranged at the margin.

Another ingenious feature pertains to the symmetrical arrangement of the haptic markers 22.1, . . . , 22.*n*, 24.1, . . . , 24.*n* in regard to the longitudinal or transverse center axis of the touch display 20. The longitudinal center axis is the line running down the middle and parallel to the lengthwise arms of the display frame 34. Perpendicular to this is the transverse center axis, i.e., down the middle between and parallel to the shorter transverse arms of the display frame 34. This ensures that the manual device 10 is suitable for both right-handed and left-handed operation. This is accomplished especially by the consistent keyless design of the graphic user interface and by the symmetrical arrangement of the haptic markers. Thus, the graphic user interface can be switched by a simple setup function from right-hand to left-hand operation. All positions of the virtual operating element 22.1, . . . , 22.*n*, 24.1, . . . , 24.*n* on the longitudinal center axis of the touch display 20 are mirror-reversed in this process.

FIG. 5 shows a back side 66 of the housing 32. On the back side 66 and arranged symmetrically to the longitudinal axis 68 are holding strips 70, 72, at which the manual device 10 can be securely held by one or both hands. The holding strips 70, 72 can have an external geometry corresponding to cylindrical segments, and the holding strips 70, 72 should start from the outer margin, i.e., the longitudinal margins of the display frame 34. Integrated in each holding strip 70, 72 is an enabling switch or enabling key 74, 76, one of which must be optionally confirmed for the releasing of the movement of the industrial robot.

Thanks to this symmetrical arrangement the hand does not become tired, since the enable switch elements 74, 76 can be operated optionally with the right or left hand. When the hand becomes tired, the other hand can take over the enabling, without interrupting the releasing of movement of the robot.

Another ingenious embodiment of the invention is characterized in that the formerly customary key switch for selection the robot operating modes "setup", "automatic" and "automatic test" is replaced by a software function. The special feature here is the data processing in secure mode. The touch display 20 is basically a single-channel and thus an insecure device. With the help of a safety controller 78 integrated in the robot controller 16 per FIG. 6, a secure functionality of the software is guaranteed. The safety controller 78 is described in European patent application 1 035 953, whose disclosure is taken up in its entirety in the present application. However, the teaching of the invention is not limited to a safety controller according to European patent application 1 035 953.

Various operating mode options are provided by the user interface 18 on the touch display 20 in the form of virtual user interfaces 80, 82, 84, such as soft keys for selection, as shown in FIG. 7. By touching one of these soft keys 80, 82, 84, the user selects a new operating mode "X". The newly selected operating mode is sent by the software of the user interface as a command "request new operating mode X" to the safety controller 78. The safety controller 78 retrieves a graphic information corresponding to this operating mode from its memory 86, such as an icon 88, and places it in a randomly determined display position in a larger image 90. The position of the icon 88 in the image 90 is known only to the safety controller 78. This image 90 is sent as a graphic file such as a bit map to the user interface 18 and placed there in a defined position for display, as shown in FIG. 8.

The user must confirm the operating mode recognized by the safety controller 78 with a finger tap on the depicted icon 88. A position of contact on the touch display is detected in the form of touch coordinates and sent back to the safety controller 78. This compares the contact position with the random display position of the icon 88 in the image 90, known only to the safety controller 78. The comparison is done under consideration of the known position of the image 90 on the touch display 20. If the contact position (within a defined tolerance) is equal to the display position, the change in operating mode is implemented. Otherwise, the change in operating mode is rejected and the former operating mode stays in place.

This method ensures a secure range of action between user and safety controller 78:
- user selects an operating mode,
- safety controller 78 displays the recognized operating mode on the operating device 10,
- user confirms the correctness of the displayed operating mode to the safety controller 78,
- safety controller 78 establishes the new operating mode.

Alternatively to the above method, the safety controller 78 can display an iconized numerical code, which is recognized by the user and needs to be entered as a number through a displayed keypad. The contact position of the displayed numbers of the keypad is sent to the safety controller, which thereby checks the correctness of the input.

The icons 80, 82, 84 are stored securely in the safety controller 78.

Optionally, a request to change operating mode can also arrive via a hardware key switch.

The inserting/removal of the key in the operating mode selector switch is simulated by a login/logout process using PIN.

The possibility, after touching the touch display 20, to more or less "drag" one's finger is utilized, according to a method of the invention, to create an analog motion instruction for the industrial robot 12. Thus, the industrial robot 12 can be steered sensitively in six degrees of freedom, such as X, Y, Z and orientations A, B, C of a tool 91, according to FIG. 6.

With the deflection of the user's finger, it is possible to give a position instruction to the industrial robot 12, similar to the cursor control per touchpad with a notebook. The industrial robot 12 can in this way travel in two coordinate directions, such as X and Y, at the same time.

In another mode, a deflection of the finger generates a speed instruction for the industrial robot 12: the more the finger is deflected, the faster the robot travels.

After the touching of a selected travel surface 100 as shown in FIG. 9, the user activates a virtual operating element 92, which is positioned in the region of the point of contact. The virtual operating element 92 can then be dragged by finger even beyond a boundary 94 across the entire touch display 20 and thus generate travel instructions. After releasing, the industrial robot 12 stops at once. For a further travel instruction, the desired surface 100 must be touched once more.

The sensitivity of the reaction to a finger motion can be adjusted continuously via a virtual operating element 96 such as a slider regulator (override) both for the position instruction and for the speed instruction.

The sensitive surface 100 for the 2D travel is placed in the vicinity of the display margin 36, so that it can still be quite easily reached with the finger (e.g., by the thumb spread out) at considerable distance from the display margin.

In order to travel as well in a third coordinate direction (e.g., Z coordinate of the Cartesian system of coordinates), a roughly finger-wide field 101 is placed by a virtual operating element 98 directly on the display margin 36, so that this field 101 can be "felt" with the finger by moving the finger, especially the thumb, along the display margin 36. This field generates a one-dimensional travel instruction, e.g., in the Z direction.

Thanks to the special arrangement, the user can clearly distinguish the two travel fields 100, 101 and reach them blindly: the field 101, directly at the display margin 36, where the finger has perceptible contact with the housing margin, activates the travel instruction for the third dimension (Z dimension). The field 100, which is placed roughly the width of a finger or thumb next to the display margin 36, activates the simultaneous travel instruction in two dimensions (X, Y dimensions).

The industrial robot 12 has six degrees of freedom. The same method as described above is used to adjust the orientation of the tool 91 with the three angles (A, B, C). For this, the display is divided into two zones. In the upper zone, for example, are the travel fields 100, 101 for the dimensions 1-3 (e.g., X, Y, Z). In the lower zone, for example, are the travel fields 102, 103 for the dimensions 4-6, such as A, B, C. The two travel fields 100, 101 and 102, 103 can be distinguished blindly with the haptic markers in the form of knobs 108, 110, 112.

After touching the travel surface 102, the user activates a virtual operating element 104, which is positioned in the region of the point of contact. The virtual operating element 104 can then be moved on the touch display to generate a travel instruction.

With a multitouch display 20, the industrial robot 12 can thus be moved simultaneously in all 6 degrees of freedom. With a single touch display, the travel functions can only be used sequentially.

For travel by means of the above-explained touch motion function, the touch display is ideally oriented collinearly to the coordinate system of the industrial robot. In this case, the robot movement coincides optimally with the finger movement on the touch display.

But if the user turns to the side with the operating device 10, this coincidence no longer obtains. The direction of movement of the robot then no longer coincides with the direction of movement of the finger.

The coordinate system of the touch display must in this case be recalibrated again to the coordinate system of the robot.

According to the invention, a special virtual operating element 114 with a pointer 116 is provided on the touch display 20. This operating element 114 must initially be moved with a finger and then the finger must be dragged in the selected direction of the robot coordinate system, e.g., the X direction. For visual supporting of the user, the X direction can be identified in the work zone of the robot, e.g., by a marking on the floor surface. The movement of the finger on the operating element 114 and thus the orientation of the pointer 116 occurs in parallel with the marking which is present in the work zone of the robot. This is identified as "200", for example, in FIG. 6. After lifting the finger from the touch display 20, the vectorial direction between the first point of contact and the point of release is calculated. With the help of this vector, the selected coordinate axis of the robot and a common Z vector, a rotation matrix is calculated by which all finger movements are subsequently transformed before being given to the robot as a travel instruction. Thus, the recalibration occurs as fast as possible with only a single gesture. After the recalibration, the two coordinate systems are again collinear with each other, and almost correlated. For better scrutiny, the direction of the calibrated coordinate system of the display is shown graphically on the touch display.

The coordinate system for the robot is indicated in FIG. 6. It will be noticed that the marking 200 runs parallel to the X axis. The Y axis runs in the plane of the footprint of the robot 12. Perpendicular to this runs the Z axis, about which the robot 12 can turn (arrow A1).

In FIGS. 1 and 6, the swivel and rotating motions of the robot 12 and the arm holding the tool 91 are indicated by the arrows 1, 2, 3, 4, 5, 6 and A1, A2, A3, A4, A5, A6, respectively. Thus, in the sample embodiment, the robot 12 can move the tool 91 with six degrees of freedom.

This calibration method of the invention, which works without sensors, can also be used for any other coordinate systems, such a freely definable frames.

The invention claimed is:

1. A method for operating an industrial robot, the method comprising:
   providing an operating device having a graphic user interface (18) and a touch display;
   displaying a virtual operating element representing a function or operating mode of the industrial robot on the touch display;
   selecting a function or operating mode of the industrial robot by a user activating the virtual operating element;
   detecting an activation of a virtual operating element;
   sending a control command corresponding to the selected function or operating mode to a safety controller;
   evaluating the control signal in the safety controller;
   selecting a graphic information correlated with the selected function or operating mode;
   generating an image in which the graphic information (88) is positioned at a display position determined by the safety controller;
   transmitting the image to the operating device and displaying the image with the graphic information on the touch display;
   detecting a confirmation position upon the user confirming the displayed graphic information;
   sending back the confirmation position to the safety controller, wherein the safety controller compares the confirmation position with the display position determined by the user; and
   changing the selected function or operating mode of the industrial robot if the confirmation position matches up with the display position.

2. The method according to claim 1, comprising randomly determining the display position of the graphic information within the image.

3. The method according to claim 1, comprising transmitting the image as a graphic file from the safety controller to the operating device, and presenting the image on the touch display in a position dictated by the safety controller or known to the safety controller.

4. The method according to claim 3, wherein the graphic file is a bitmap.

5. The method according to claim 1, comprising displaying a virtual operating element corresponding to the function or operating mode as the graphic information.

6. The method according to claim 1, comprising displaying a numerical code graphically as the graphic information.

7. The method according to claim 1, comprising retaining the graphic information in a memory of the safety controller.

8. The method according to claim 7, wherein the graphic information is retained in the memory in two channels.

9. The method according to claim 1, comprising evaluating the control signal in two channels in the safety controller.

10. The method according to claim 1, comprising showing operating modes or options in the form of virtual operating elements on the touch display of the graphic user interface.

11. The method according to claim 1, comprising generating the coordinates of the display position by a random number generator.

12. The method according to claim 1, comprising detecting touching of the virtual operating element on the surface of the touch display by determining a first coordinate of a point of contact, wherein a triggering of the function of the virtual operating element occurs if the first coordinate of the point of contact after a lasting contact with the surface of the touch display leaves a predetermined coordinate region by a manual action of the user.

13. The method according to claim 12, wherein the manual action is triggered by a gesture of the user.

14. The method according to claim 13, wherein the gesture is a dragging of a finger on the touch display into, or out from, the predetermined coordinate region.

15. The method according to claim 13, wherein the gesture is carried out in a defined direction.

16. The method according to claim 13, wherein the an intensity of the gesture is continuously adjusted.

* * * * *